United States Patent [19]

Scott

[11] 3,985,842

[45] Oct. 12, 1976

[54] METHOD OF MAKING ELECTRICAL MAGNESIA

[75] Inventor: John J. Scott, Niagara Falls, Canada

[73] Assignee: Norton Company, Worcester, Mass.

[22] Filed: July 3, 1972

[21] Appl. No.: 268,739

[52] U.S. Cl. .................................................. 264/12
[51] Int. Cl.² ........................................... B01J 2/02
[58] Field of Search ..................................... 264/12

[56] References Cited
UNITED STATES PATENTS

| | | | |
|---|---|---|---|
| 3,135,473 | 6/1964 | Schrader et al. | 264/140 |
| 3,150,947 | 9/1964 | Bland | 264/12 |
| 3,469,961 | 9/1969 | Barnhart et al. | 264/12 |

*Primary Examiner*—Robert F. White
*Assistant Examiner*—J. R. Hall
*Attorney, Agent, or Firm*—Rufus M. Franklin

[57] ABSTRACT

A molten magnesia is air quenched to provide a very large proportion of solid free flowing spheres of fused magnesia, a large percentage of which are smaller than about 35 Tyler mesh, which may be used directly in electrical resistor units without the necessity of crushing and calcining while the larger sized spheres may be crushed if desired and can be used with the uncrushed spheres without being calcined. The method may employ sea water magnesite or any other source of raw material having a high magnesia content that is cheap and readily available, the product being improved and more easily fused by the addition of small amounts of alumina, silica and calcia to the magnesite as it is being fed to the fusion furnace.

5 Claims, No Drawings

METHOD OF MAKING ELECTRICAL MAGNESIA

BACKGROUND OF THE INVENTION

Fused crushed magnesia grain is normally used for insulating electrical resistance wires from an outer protective metal sheath. Various sources of magnesia are available for feed to the fusion process but currently a primary source of high quality ore for the production of electrical grade magnorite, requires shipment all the way from India. All commercial ores available heretofore have been relatively expensive and preparation of each of the respective ores for use has involved fusion, solidification, sorting, crushing, calcining and screening procedures that produce additional costs making the conventional electrical magnesia grain products relatively expensive as compared with the invention disclosed herein.

It is known that high temperatures are required to melt the purer magnesia ore used for electrical magnesia, i.e. those with a magnesia content in the order of 94% or higher MgO and further that the molten product produced from such relatively pure sources of magnesia has a narrow solidification range that makes the tapping of the fusion bath difficult. For this reason fused magnesia used for electrical insulation purposes has heretofore been solidified in large masses requiring several stages of crushing to produce grains of a size to be used for electrical insulation and after crushing it has been found necessary to calcine the crushed product to make it useful as an insulation in the known electrical resistor type devices.

BRIEF DESCRIPTION OF THE INVENTION

I have found that a fused magnesia electrical insulator product can be made which does not require extensive crushing and calcining as has been usually practiced in the past. In addition sea water magnesite having a high magnesia content can be used which provides an inexpensive source of magnesia for making the product of my invention. In following my invention certain impurities such as boron and iron compounds that formerly could not be tolerated in electrical magnesia and which are found in sea water magnesite, are dispersed in a way to minimize their otherwise harmful effect. At the same time additives, in the form of alumina, silica and calcia are mixed in the raw batch feed to serve the function of lowering the melting temperature of the fusion and extend the solidification range of the molten material produced in the furnace.

It is known that the purer forms of magnesia conventionally used for production of electrical magnesia melt at a temperature in the range above 2700° +C. and have a rather narrow solidification range at these temperatures. It has been thought in the past that such sources of magnesia must be used for making these electrical insulation products and the melting and solidification characteristics of these magnesias have made air quenching from the molten state impactical. The above named additions i.e. alumina, silica, and calcia are, in the preferred form of my invention, fused with sea water magnesite to lower the melting temperature of the mixture to as low as 2000° C. and lower the viscosity of the molten bath to widen the solidification range whereby to make air quenching possible. I have discovered a magnesia composition and procedure for air quenching the molten magnesia compound through an air driven aspirator nozzle that enables me to produce a very large proportion of solid spheres in a size range of under 35 mesh on the Tyler screens, which solid spheres can be used without further treatment for insulation in electrical devices. The larger spheres having screen sizes above 35 mesh can be crushed to pass through a 35 mesh Tyler screen and the resulting crushed product can be mixed with the uncrushed air quenched spheres to provide a useful electrical magnesia insulation. It is to be noted that none of the air quenched grain, even the crushed particles when added to the uncrushed spheres of this invention, need be calcined or annealed before use of the mixture as an electrical magnesia.

DETAILED DESCRIPTION

My invention is concerned with the conversion of a molten magnesia to a granular solid product composed of spheres that may be substantially all used, directly as produced, for electrical insulation in resistor units. When an electrical magnesia is prepared as here taught, the crushing and calcining steps heretofore usually needed in connection with the preparation of a fused magnesia to condition it for use as an electrical insulation, can be eliminated. I produce air quenched spheres of a solidified magnesia product directly from a molten mass which spheres are nearly all solid and many of which are of a size to be used directly as an insulation in electrical resistor units and which product requires only a minimum degree of crushing for a portion only of the spheres of solidified product and no calcination of the final mixture of crushed and solid spherical product. The mixture of crushed and smaller uncrushed spherical grains of my product is as free flowing as the known fused, crushed and calcined product heretofore used for electrical insulation, and my product may be used in the same way to provide a layer of the air quenched magnesia around a sheathed resistor wire to provide an insulator having a resistivity sufficiently high to make the air quenched product quite practical for electrical resistor units.

In following my invention substantially all solid particles result having good electrical insulating properties. The solid material serves to conduct the heat from the resistor wire to the sheath most expeditiously while the particles are effective to provide efficient electrical insulation to permit the unit to function.

The spheres of my invention are air quenched by fusing a suitable charge to form the desired magnesia composition useful as an electrical insulating material and then atomizing and partially chilling the droplets of the molten material with a compressed air within a pressure range of from 70 to 125 pounds per square inch and higher for driving an aspirating nozzle like that shown in the co-pending application of Ronald W. Trischuk Ser. No. 134,803 for "Improved Aluminum Oxide Pressure Blasting Abrasives and Method of Making" filed Apr. 16, 1971. The droplets produced by such a nozzle having an internal diameter of 2.5 inches for molten fluid flow, with an area of about 1.5 square inches through which the air issues, are projected into the air and the molten material is cooled and solidifies as the droplets fly through the air to be collected on the floor. The internal diameter of the nozzle as well as the area of the exit passage for the atomizing air blast may be varied depending upon the volume of liquid flow to be acted upon by compressed air at a given pressure.

I have demonstrated the usefulness of my product and find that it is very useful as an insulator in resistor units having a wire centered in a metal sheath for use in domestic appliances even though its electrical resistivity as measured in a Fetterley Cell is relatively low. Quite unexpectedly my air quenched product has been found in practice to be substantially the equal of the conventional purer form of crushed and calcined magnesia grain having a much higher electrical resistivity. I do not know why my material with a much lower resistivity works quite satisfactorily under these circumstances but I offer the following explanation as a possible theory for the operativeness thereof. In the previous manufacture of magnesia used for electrical insulation it has always been found necessary to use relatively high purity material which melts at a temperature in a range above 2700° C. In addition to the obvious difficulties occasioned by the use of magnesia having a high melting temperature, the relatively pure molten magnesia compositions have a very narrow solidification range which makes it substantially impossible to work with these liquid magnesias except by solidifying relatively large masses therof and subsequently crushing and screening the magnesia grain to produce an electrical insulation for resistor units. This known crushed relatively pure form of magnesia is usually calcined or annealed to eliminate surface activity on the individual grains. Such surface activity is known to exist by those skilled in the art, and is produced by the application of shearing stresses to the crystalline surfaces of the grains during the crushing operations. It is my belief that this surface activity, if not eliminated, permits the crushed uncalcined grain to have a higher electrical conductivity as compared with the crushed calcined grain. Thus when crushing is required to any great extent to produce magnesia grain for electrical insulating purposes from a fused, solidified magnesia it is the conventional practice to inactivate the surface portions of the crushed grains to minimize its electrical conductivity. In my product, the uncrushed spheres hold the surface active areas of the uncalcined crushed sphere particles separated so that paths of electrically conductive active surfaces cannot be established through the mass of the product and even though the electrical resistivity measurement of my product is not as high as the electrical resistivity of the conventional crushed and calcined product, as determined in the Fetterley Cell, my grain has been found in practice to be equally as good as the known crushed and calcined grains used heretofore. (The Fetterley Cell and its method of use is described in an article entitled "High Temperature Resistivity Measurement on Compressed Granular Refractory Material" by G. H. Fetterley, Transactions of Electro Chemical Society, Vol. 83-1943 page 191.)

Referring now to the preferred practice of my invention in preparing the magnesite for furnacing, particular additives selected from the group consisting of alumina, silica and lime are included in the raw batch feed for the fusion furnace, to not only lower the melting temperature of the mixture but to simultaneously accomplish a wider spread of the solidification temperature range. When the temperature range over which the fused magnesia compound solidifies is extended, it becomes practical to air quench the molten material in a manner such that very small solid spheres of magnesia can be produced. The bulk of these solid spheres can be used directly without further treatment for electrical insulation purposes. The proportion of larger spheres that are inherently produced in my air quenching step can be used after being crushed and mixed with the solid smaller sphere particles to produce a product having significant portions of uncrushed and uncalcined magnesia particles forming an electrical insulating material which has a sufficiently high resistivity to be useful in sheathed electrical resistor units.

The large proportion of spheres produced by air quenching my magnesia compound have a mesh size of under 35 on the Tyler screen and can be used directly for insulation. When the molten magnesia composition is poured through the air driven aspirator nozzle referred to above to be air quenched, with a proper selection of nozzle dimensions and compressed air pressures, as much as 40% of the molten magnesia composition can be converted to solid spheres in the smaller than 35 Tyler mesh size range. The remainder of the air quenched material will all fall in a size range substantially under 4 mesh with most of these larger sized air quenched particles passing through a 10 mesh screen. The larger sized spheres retained on the 35 mesh screen can be crushed so that the final crushed product will pass through a 35 mesh Tyler screen and then the crushed grains can be mixed with the solid uncrushed smaller spheres. The individual grains of the crushed material will have a large proportion of the virgin spherical surfaces exposed as compared with the exposed grain surfaces of a conventional fused crushed electrical magnesia product and in any event when the mixing of the air quenched, uncrushed spheres smaller than 35 mesh and the crushed sphere particles smaller than 35 mesh is completed, as suggested above, the finer uncrushed spherical particles will hold the crushed surfaces apart so that an electrically conductive path cannot be established across the now spaced apart active faces of the crushed magnesia mixed with relatively inactive surfaces of the uncrushed spheres. By reason of such spacing of the exposed crushed surfaces as here taught, calcining of the final product may be eliminated and it is obvious that when the plus 35 mesh spheres need be crushed only to pass through a 35 mesh screen, a substantial portion of the crushing operation is likewise eliminated.

In following one form of my invention, sea water magnesite was used as a source of the magnesia. Such material included a boron content in the range of up to 300 parts per million or more which might otherwise have constituted a problem when present in electrical magnesia as described in my co-pending application Ser. No. 236,333 filed Mar. 20, 1972 entitled "A Sintering Inhibitor for Fused MgO Grain." The air quenching of sea water magnesite tends to minimize the undesired sintering effect noted when boron is present.

I fused a quantity of this dead burned sea water magnesite with the addition of silica and alumina in the presence of a small amount of lime. The mixture was fed to and fused in a casting furnace that was powered by a 3 phase arc, the feed being continuous at a rate of approximately 500 lbs/hr and the material became molten at a temperature of approximately 2300° C. as determined from a phase diagram published in the handbook "Phase Diagram for Ceramists" by Levin, Robbins and McMurdie, compiled by the National Bureau of Standards, edited and published by the American Ceramic Society Inc., see $MgO.Al_2O_3.CaO$ FIG. 278 on page 115 of the 1956 edition and $MgO.Al_2O_3.SiO_2$ FIG. 712 on page 246 of the 1964 edition. As the molten bath was built up in the furnace, it was tapped from time to time by tilting the furnace the molten material was delivered into the above mentioned type of aspirator nozzle driven by compressed air. The expanding air impinged on the flow of molten fluid moving through the center passage of the nozzle and the high velocity air stream disintegrated the liquid flow to produce very small droplets of the molten composition, which droplets became solid spheres as they wre projected outwardly and fell to the floor. The resulting solidified product has a composition as follows:

| SiO₂ | 19.35% |
|---|---|
| Fe₂O₃ | 0.21% |
| Al₂O₃ | 10.34% |
| CaO | 0.65% |
| boron | 240 parts per million (ppm) |
| sulphur | 41 parts per million (ppm) |

The remainder being magnesia and innocuous impurities to make up 100%.

Approximately 40% of the air quenched material described above coming from the air quenching nozzle, was finer than 35 mesh on the Tyler screen. The material larger than 35 mesh was impact crushed to pass through a 35 mesh screen. The crushed and uncrushed products were mixed and the analysis of the final screen sizes of the product was as follows:

on 40 – 0.0%
on 45 – .3
on 50 – 8.8
on 60 – 14.2
on 80 – 21.1
on 100 – 12.7
on 120 – 8.0
on 140 – 9.0
on 170 – 6.8
on 200 – 5.7
on 325 – 9.0
on 425 – 1.6
through 425 – 2.1

The electrical resistivity in megohm inches at 980° C. was 5.04. The density of the final product as determined on an air pycnometer was 3.5 gms/cc, which is close to the real densities of the compounds (MgO 3.58, Mg$_2$SiO$_4$ 3.22 MgA$_2$O$_4$ 3.58) which are the principal components of the spheres formed herein, which indicates that the particles of this product are very close to being 100% free of voids.

X-Ray analysis of material from this fusion, based on diffraction with Cu Kα radiation under standard operating conditions gave a peak resolution throughout the X-Ray diffractomer pattern which was generally very good. The pattern revealed three phases including a major magnesium oxide phase with minor phases showing forsterite (Mg$_2$SiO$_4$) and magnesium aluminate spinel (MgO.Al$_2$O$_3$). The peak intensities of the two minor phases were approximately equal and the major magnesia peak proved to be two or three times that of the minor phases.

This product was tested for electrical resistivity and sinter index because of the presence of boron. The material formed from the uncrushed spheres and crushed spheres of air quenched material as described above was tested without calcining and for comparative purposes the mixture was calcined for various time periods and temperatues with the following results:

| Time | Calcining Temp. | Electrical Resistivity in megohm inches Measured in the Fetterley Cell 980°C. | 850°C. | Sinter Index in grams |
|---|---|---|---|---|
| 0 | 0 | 6.6 | 79.3 | 55 |
| 1 hr. | 200°C. | 4.6 | 55 | <25 |
| 1 hr. | 950°C. | 6.5 | 63 | <25 |
| 1 hr. | 1150°C. | 13.9 | 55 | <25 |
| 4½ hr. | 1275°C. | 22.8 | 251 | <25 |

The above described electrical magnesia having resistivity of 6.6 megohm inches was subjected to an accelerated life test in a straight resistance unit, which test is used in industry, and I have found that my material having a resistivity of 6.6 megohm inches is useful for all low and intermediate temperature ranges and I predict similarly made electrically magnesias will be valuable in the high temperature applications as well. Quite unexpectedly and for reasons I cannot explain my product is useful despite a somewhat lower electrical resistivity measurement than has heretofore been found to be required in a magnesia used for electrical insulation in a sheathed resistor unit.

The sinter index listed above is expressed in grams and is determined in accordance with the final draft of the "Proposed Standard Method for Measure of the Degree of Sinter of Electrical Grade Magnesium Oxide for use in Sheather Type Electric Heating Elements" published on Mar. 31, 1970 by the American Society for Testing Materials. A sinter index of under 100 is quite acceptable for the electrical resistor units used in the home appliance products in industry.

Larger or smaller amounts of alumina, silica and lime can be used but the proportions I suggest be employed are within the range of from 60 to 90% magnesia with an addition of up to 25% silica and up to 25% alumina with lime added in an amount of less than 50% of the silica content at all times, consistent with such interference with smooth furnace operations as can be tolerated, but to improve furnacing the lime should be held to less than about 1% of the entire composition. A preferred product would include 20% silica, 10% alumina, and the remainder being 70% made up principally of magnesia including less than 1% lime and such impurities as remain after fusion. The addition of lime aids the electrical characteristics of the product but does cause furnacing problems and therefore a balance must be sought, dependent on the degree of interference with the economics of the operation that is acceptable.

In another run I fed several raw batch mixtures in succession to a four cubic foot tapping furnace and made five air quenching runs from the successively formed fused baths to solidify the material. In each case I started with brine magnesite purchased from the Standard Lime Company, to which I added alumina and silica in various proportions to provide three different raw batch compositions. The run was started with a raw batch having the composition as follows:

55% brine magnesite including less than 1% lime and impurities
31% Bayer process Al₂O₃
14 % silica sand After becoming molten a part of the furnace charge was tapped through the aspirator nozzle that was operated at an air pressure infeed of 86 pounds per square inch. The resulting air quenched particles of this first tap had a composition of:

| | |
|---|---|
| 14.48% | SiO₂ |
| 0.12% | Fe₂O₃ |
| 26.16% | Al₂O₃ |
| 0.63% | CaO |
| 78 parts per million of sulfur | |
| 300 parts per million of boron being present | |

The remainder being MgO with a small percent of innocuous impurities.

The 4 cubic foot furnace was run continuously and a second raw batch feed was slowly delivered into the furnace on top of the remainder of the molten mass left in the furnace after the first tap. The second raw batch was a mix including:

61% of the same brine magnesite
17% Bayer process alumina
22% silica sand

After fusion and a second tapping through the nozzle run at 80 psi, the air quenched product had the following analysis:

| | |
|---|---|
| 17.99% | SiO₂ |
| 0.15% | Fe₂O₃ |
| 14.97% | Al₂O₃ |
| 0.60% | CaO |
| 91 ppm | sulfur |
| 320 ppm | boron |

The remainer being MgO with a small percentage of innocuous impurities.

A third tapping was made upon completing the feeding of the second raw batch mix and after the third tapping of the furnace through the nozzle being fed with air at 76 psi, the air quenched product showed an analysis of:

| | |
|---|---|
| 18.86% | SiO₂ |
| 0.10% | Fe₂O₃ |
| 14.11% | Al₂O₃ |
| 0.62% | CaO |
| 69 ppm | sulfur |
| 300 ppm | boron |

The remainder being mostly MgO with a small amount of impurities.

A third raw batch feed mix was then fed into the still continuously operating furnace. This mix included:

64% of the same brine magnesite
10% Bayer Process alumina
26% silica sand

After fusion the resulting material was tapped twice from the furnace and air quenched. The nozzle for these fourth and fifth taps from this furnace run was supplied with air at 76 and 70 psi and the resulting solidified grits had an analysis respectively as follows:

| 4th Tap | 5th Tap | |
|---|---|---|
| 27.59% | 27.54% | SiO₂ |
| 0.08% | 0.32% | Fe₂O₃ |
| 13.14% | 11.74% | Al₂O₃ |
| 0.65% | 0.65% | CaO |
| 78 ppm | 57 ppm | sulfur |
| 300 ppm | 300 ppm | boron | with the remainder in each case being mostly MgO with some small percentage of innocuous impurities.

It is apparent that the molten bath in the furnace was composed of blends of the various infeed mixtures since continuous fusion of the infeed material and periodic tapping of the furnace caused various fusions to take place in the furnace.

Another run was made with a raw batch that was fed into a furnace containing the residue from a previus MgO fusion, the raw batch in this instance being made up of:

75% brine magnesite
5% CaO
5% SiO₂
10% Al₂O₃

The furnace run was not too smooth because of the relatively large proportion of lime present in the fusion bath which tubulence was anticipated, but the relatively large addition of lime was added in the raw batch to produce a final product for testing wherein the lime would be present in an amount about equal to ½ the amount of silica content in the final product. The residual MgO in the furnace at the start of this run was known to have a high silica content. The final solidified material was useable for electrical insulation and had the following analysis.

| | |
|---|---|
| SiO₂ | 8.44% |
| Fe₂O₃ | 0.61% |
| Al₂O₃ | 10.81% |
| CaO | 4.12% |
| boron | 210 ppm |

The screen analysis of this product gave the following data:

| | |
|---|---|
| on 35 mesh Tyler | 33.94% |
| on 60 | 16.68% |
| on 80 | 13.92% |
| on 200 | 26.36% |
| on 325 | 6.10% |
| through 325 | 3.52% |

The addition of additives, uniformly distributed throughout the solidified product, as here taught coupled with the air quenching method of solidification which produces this improved electrical insulating magnesia product, is peculiar to this invention.

As compared with the elimination of impurities inherent in the prior methods used for the making of electrical magnesia grain, such as the conventional tray kiln zone refining method and the large pig method, when the air quenching method is used the additives are uniformly distributed through the mass of each of the grains of air quenched solidified grains. The practice of either the zone refining process or the large pig method is not indicated when a uniform dispersion of additives is desired because these procedures would cause the alumina, silica and lime to migrate through the molten magnesia phase as the relatively slow solidification step proceeds, the impurities being concentrated in the portion of the mass that is last to solidify. The use of the air quenching method is thus important to the production of the magnesia based insulation grain material of my invention in order to obtain the uniformity of composition desired wherein the alumina, silica and lime additives are important elements of the resulting product.

I have fused sea water magnesite with the above described additives in a conventional tapping furnace having a circular chamber approximately 5 feet in diameter. When the fused bath reached the desired level in the furnace, the tap was made and the molten material was delivered to the aspirator nozzle described above. The molten material was passed through the nozzle at a rate of from about 100 pounds/minute to as high as 200 pounds/minute to produce useable product much of which can be used directly from the furnace with portion only requiring some crushing. After the desired volume of fluid had been run from the fusion chamber the furnace was returned to the fusing cycle so that another pour could be developed.

All percentage figures used above are by weight of the whole mass being considered. This applies to the chemical analyses of the compositions produced in the various fusions as well as the retention of differently sized spheres on the various Tyler mesh screen sizes as indicated.

It has been indicated above that sea water magnesite contains impurities other than the lime indicated above. These are indicated as being more or less innocuous and are present in very small amounts for example a typical analysis shows the presence of:

| | |
|---|---|
| 0.07% | $ZrO_2$ |
| 230 ppm | $MnO_2$ |
| 300 ppm | boron |
| less than 100 ppm | NiO and |
| less than 100 ppm | sulfur |

These impurities can be tolerated in the air quenched product with no special purification step needed.

While the above describes the preferred form of my invention it is apparent that many modifications thereof which may occur to those skilled in the art, will fall within the scope of the following claims.

What is claimed is:

1. A method of making a granular electrical insulating material for use in electrical resistance heaters comprising fusing a commercial source of magnesia in the presence of from 10% to 40% by weight of additives selected from the group consisting of alumina and silica, and alumina, silica and lime, and then air quenching the molten magnesia composition in a compressed air stream to produce solidified spheres more than 40% of which are capable of passing through a 35-mesh Tyler screen, crushing the larger sized spheres of the air quenched magnesia composition to pass through a 35 mesh Tyler screen, and providing a homogeneous mixture of the crushed and air quenched smaller spheres useful for such electrical insulation.

2. A method of making a granular electrical insulating material for use in electrical resistance heaters as described in claim 1 comprising fusing sea water magnesite with said additives.

3. A method of making a granular electrical insulating material for use in electrical resistance heaters in accordance with claim 2 comprising fusing said magnesite in a bath wherein magnesia constitutes from 60% to 90% of the weight of the bath, the bath including said additives in the proportions of up to 25% by weight alumina, up to 25% by weight silica, and a lime content less than ½ the silica content.

4. A method of making a granular electrical insulating material for use in electrical resistance heaters in accordance with claim 3 comprising fusing said magnesite in a bath wherein lime, magnesia constitute 70% by weight of the bath; the bath including said additives in the proportion of 10 parts by weight alumina, 20 parts by weight silica.

5. A method of making a granular electrical insulating material for use in electrical resistance heaters as in claim 4 comprising fusing said magnesite and additives in the presence of lime with 1% of the total weight of the bath being lime.

* * * * *